Jan. 13, 1925. 1,522,524
A. L. JOHNSON
POWER TRANSMITTER
Filed Oct. 3, 1921
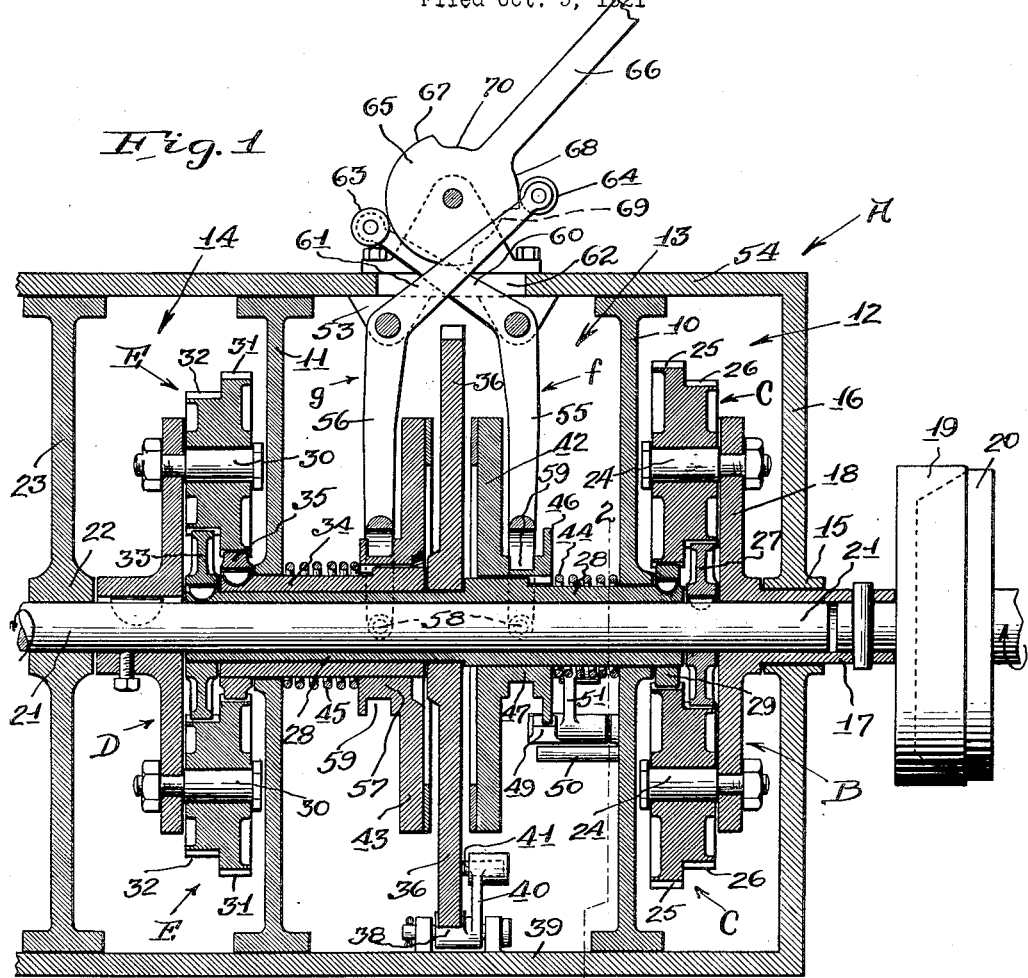
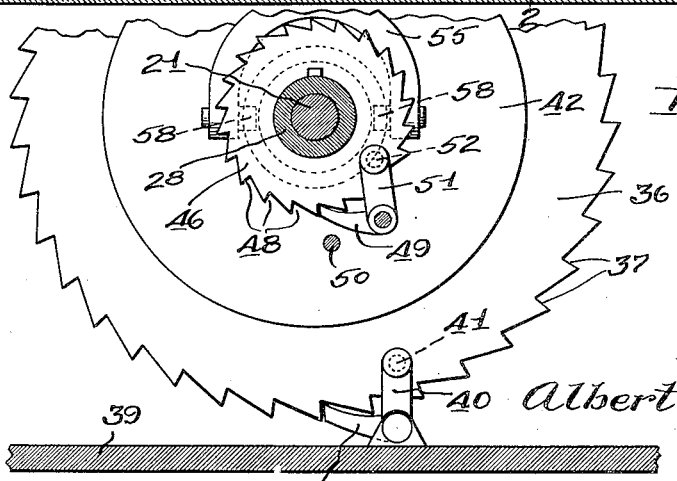
Inventor
Albert L. Johnson
Attorneys
Bradbury + Caswell Patented Jan. 13, 1925.

1,522,524

UNITED STATES PATENT OFFICE.

ALBERT L. JOHNSON, OF WILERNIE, MINNESOTA.

POWER TRANSMITTER.

Application filed October 3, 1921. Serial No. 504,965.

*To all whom it may concern:*

Be it known that I, ALBERT L. JOHNSON, a citizen of the United States, residing at Wilernie, in the county of Washington and State of Minnesota, have invented a new and useful Power Transmitter, of which the following is a specification.

My invention relates to improvements in power transmitters.

Its principal object is to provide a variable speed transmission mechanism, whereby the speed ratio between a driving and a driven element may be increased or diminished without freeing the latter from the former.

With the foregoing and other objects in view, which will appear in the following description, the invention resides in the novel combination and arrangement of parts and in the details of construction hereinafter described and claimed.

In the drawings, Fig. 1 is a longitudinal central sectional view of a device embodying my invention and Fig. 2 is a sectional view taken on the line 2—2 of Fig. 1.

Reference being had to the drawings, wherein similar letters of reference are employed to designate similar parts, it will be noted that I have used the reference letter A to indicate the transmission housing. This housing is supplied with two partitions 10 and 11 dividing the housing into three compartments 12, 13 and 14. A bearing 15 in the front end 16 of the housing A revolubly receives a hollow driving shaft 17 having an annular flange 18 at its inner end to form a gear carrier B within the compartment 12. Fixed upon the outer end of said shaft 17 is a clutch member 19, which co-acts with a driven clutch member 20. Said shaft 17 may, of course, be propelled by other means, said means being only one of numerous methods which might be employed for driving the same. A driven shaft 21 journaled at one end in said hollow driving shaft 17 and passing through the housing A is journaled in a bearing 22 in the wall 23 of said housing, said shaft being extended from the housing and supplying a take-off connection for mechanism to be driven by the power transmitter. Journals 24 mounted on the gear carrier B, in parallelism with the common axis of the shafts 17 and 21 and in diametrically opposed relation, carry dual gears C, the gear member 25 of each gear being greater in pitch diameter than its companion gear member 26. These dual gears have a planetary motion about the shaft 21, the gear members 26 thereof meshing with a gear 27 keyed to the shaft 21. A long sleeve 28, revoluble on the shaft 21 and reaching from the compartment 12, through the partitions 10 and 11 into the compartment 14, has a gear 29 keyed thereon and meshed with the gear members 25 of the dual gears C. Keyed to the shaft 21, within the compartment 14, is a gear carrier D similar to the gear carrier B in the compartment 12. Journals 30, on the gear carrier D, carry dual gears E, each gear having a gear member 31 greater in pitch diameter than its companian gear member 32. The smaller gear members 32 mesh with a gear 33 keyed to the sleeve 28, above described. A second sleeve 34 revoluble upon the first mentioned sleeve 28 reaches from the compartment 14, through the partition 11 and into the intermediate compartment 13. A gear 35 keyed to the end of the sleeve 34, within the compartment 14, meshes with the gear members 31 of the dual gears E. Within the intermediate compartment 13, is a friction disc 36, the same being revolubly mounted upon the sleeve 28 and formed at its periphery with ratchet teeth 37. A dog 38, pivoted on the base 39 of the housing A, in position to engage the said ratchet teeth 37, is supplied with an arm 40 having a friction plug 41 therein bearing against one side of the friction disc 36. Rotation of said disc 36 in one direction (clockwise, Fig. 2) operates through the arm 40 to disengage the dog 38 from the teeth 37, thus freeing the disc 36, while the initial turning movement of said disc, in the opposite direction (clockwise, Fig. 2), results in the locking of the same through the operation of the arm 40. Clutch discs 42 and 43, arranged upon opposite sides of the friction disc 36, are feathered upon the sleeves 28 and 34 respectively. The clutch disc 42 is adapted to be pressed into engagement with one side of the friction disc 36, by means of a spring 44 encircling the sleeve 28 and interposed between the partition 10 and said clutch disc 42. A similar spring 45, encircling the sleeve 34 and interposed between the partition 11 and the clutch disc 43, operates to press said clutch disc into engagement with the other side of said friction disc 36. An annular flange 46 on the hub 47 of the clutch disc 42 has ratchet teeth 48 in the periphery thereof, said teeth being arranged like the teeth 37 on the periphery of the friction disc 36. A dog 49, pivoted on the partition 10 and provided with a stop pin 50, also in said partition, is arranged to engage the ratchet teeth 48 in the flange 46. Said dog 49 is provided with an arm 51 having a friction plug 52 therein arranged to bear against the face of the flange 46. This dog 49 operates, through the action of the arm 51, in a manner identical with that of the dog 38, hereinbefore described.

I supply means for shifting clutch discs 42 and 43 out of contact with the friction disc 36, against the action of the springs 44 and 45 and also for permitting said springs to function, whereby either or both of said clutch discs may be allowed to engage the friction disc 36. The form of said means, as illustrated, includes two reversely arranged bell-crank levers $f$ and $g$, the same being pivotally suspended from brackets 53 depending from the cap 54 of the housing A. The arms 55 and 56 of said levers are bifurcated at their lower ends, the branches of the arm 55 reaching downward upon opposite sides of the hub 47 of the clutch disc 42 and the branches of the arm 56 reaching downward upon opposite sides of the hub 57 of the clutch disc 43. Opposed rollers 58, at the extremities of said branches, register with annular grooves 59 in the hubs 47 and 57. The arms 60 and 61 of the levers $f$ and $g$ project through an opening 62 in the housing A and cross each other as shown in Fig. 1. These arms 60 and 61 carry cam-rollers 63 and 64 at the extremities thereof. A cam 65, mounted on the housing A and adapted to be rocked back and forth by a hand-lever 66 thereon, is formed with high surfaces 67 and 68 and low surfaces 69 and 70. The cam-rollers 63 and 64 ride upon the surfaces of the cam 65, due to the action of the springs 44 and 45. When the hand-lever 66 is inclined to the left, the cam-rollers 63 and 64 bear upon the low surfaces 69 and 70 resulting in the engagement of both clutch discs 42 and 43 with the friction disc 36. When the hand-lever 66 is in substantially upright position, the cam-roller 64 still bears upon its respective low surface 69, but the cam-roller 63 bears upon the high surface 67, thus resulting in the engagement of the clutch disc 43 with the friction disc 36 and the disengagement of the clutch disc 42 from said friction disc. When the hand-lever 66 is tilted to the right (Fig. 1), the cam-rollers 63 and 64 occupy positions upon the high surfaces 68 and 67, wherein both clutch discs 42 and 43 are disengaged from the friction disc 36. It will now be understood, that manipulation of the lever 66, effects three conditions, one, wherein both clutch discs 42 and 43 are disengaged from the friction disc 36, a second condition, wherein the clutch disc 43 alone engages the friction disc 36 and a third condition, wherein both clutch discs 42 and 43 engage the friction disc 36. Under the condition first stated, the driven shaft 21 is rotated in the same direction as the driving shaft 17, but at a reduced rate of speed (low) with respect to the speed of said driving shaft. Under the second condition, the driven shaft 21 is rotated in the same direction at a speed (intermediate) greater than in the first instance, but at a speed less than that of the driving shaft 17. Under the third condition, the driven shaft 21 turns at a speed (high) in unison with the driving shaft 17. In low speed (both clutch discs 42 and 43 free from friction disc 36, Fig. 1), the load on the driven shaft 21 causes the gear 27 to resist turning. When the driving shaft 17 turns (clockwise, as viewed from right side, Fig. 1), this resistance is imparted to the gear members 25 and 26 of the dual gears C, and tends to rotate the flange 46 in a counter-clockwise direction (Fig. 2), through the gear 29 and sleeve 28. The teeth 48 on said flange are engaged by the dog 49, upon initial tendency to rotate in this direction, thus resulting in locking the flange 46, sleeve 28 and gear 29 against counter-clockwise rotation. Said gear 29, being thus locked, results in the rotation of the driven shaft 21 through the gear 27, as the dual gears C circle about the gears 29. The relation of the pitch diameters of said gears C, 27 and 29 is such that the driven shaft 21 is propelled at a rate of speed considerably less than that of the driving shaft 17. The rotation of the driven shaft 21 results in a non-effective idling motion of the clutch disc 43, through the dual gears E, gear 35 and sleeve 34. In changing from low to intermediate speed, the clutch disc 43 is engaged with the friction disc 36. The idling motion of the clutch disc 43, being in a counter-clockwise direction, when said disc is free, causes the friction disc 36, upon the engagement of the clutch disc 43 therewith, to become locked, against similar rotation, by the dog 38. This condition existing, the gear 35 on the sleeve 34 is also locked against counter-clockwise rotation. The locking of this gear 35 results in the rotation of the sleeve 28 and gear 29 in a clockwise direction. Remembering that the sleeve 28 and gear 29 thereon are locked against counter-clockwise revolution, when the driven shaft 21 turns at low speed, it will be understood that by imparting movement to said gear 29, as just described, will result in the propulsion of the driven shaft 21 at a rate of speed higher than that existing when said gear is fixed. In high speed both clutch discs 42 and 43 engage the friction disc 36, which condition results in locking the driving and driven shafts 17 and 21 with respect to each other, through the entire train of gears. In shifting from high speed to second speed, the friction disc 36 is brought to rest and locked by the dog 38 upon the initial tendency of said friction disc 36 to turn in the opposite direction. In shifting from second speed to low speed, the flange 46 is brought to rest and locked by the dog 49.

In use, power may be transmitted from driving mechanism to driven mechanism, the speed of the latter with respect to the former being varied, at will, without interruption.

While I have shown clutch shifting mechanism of the progressive type, it will be understood that I also contemplate the employment of clutch shifting mechanism of the selective type.

Other changes in the specific form of my invention, as herein disclosed, may be made within the scope of what is claimed without departing from the spirit of my invention.

Having described my invention, what I claim as new and desire to protect by Letters Patent is:

1. In a power transmitter, a housing having end compartments for gearing and an intermediate compartment for clutch members, aligned driving and driven shafts journaled in the housing, the former extending into the front compartment, while the latter extends through all of said compartments, a planetary dual gear rotated within the front compartment by the driving shaft, the gear members of said dual gear varying in diameter, a gear keyed to the driven shaft and in mesh with the smaller gear member, a long sleeve revoluble on the driven shaft and extending from the front compartment, through the intermediate compartment, into the rear compartment, a gear fixed on said sleeve in mesh with the larger gear member of said dual gear, a short sleeve revoluble on the long sleeve and extending from the rear compartment into the intermediate compartment, opposed clutch discs within the intermediate compartment, one feathered on the long sleeve and the other feathered on the short sleeve, said first clutch disc being locked against rotation in one direction, a friction disc, common to both clutch discs, interposed between said clutch discs and revoluble only in the direction of said first clutch disc, means for sliding the clutch discs into and out of engagement with the friction disc, a second planetary dual gear revolubly carried upon the driven shaft within the rear compartment, the gear members thereof being of unequal diameter, a gear fixed to the long sleeve in mesh with the smaller gear member of said second dual gear and a gear fixed to the short sleeve in mesh with the larger gear member of said second dual gear, all as and for the purpose described.

2. In a power transmitter, a housing, aligned driving and driven shafts journaled in said housing, a planetary dual gear rotated by the driving shaft, the gear members of said dual gear varying in diameter, a gear on the driven shaft in mesh with the smaller gear member, a long sleeve revoluble on the driven shaft, means for locking said sleeve against rotation in one direction, a gear thereon in mesh with the larger gear member, a short sleeve revoluble on the long sleeve, opposed clutch discs, one feathered on the long sleeve and one feathered on the short sleeve, a friction disc common to said clutch discs, said friction disc being interposed between the clutch discs and loosely journaled on the long sleeve, means for locking said friction disc against rotation in one direction, means for sliding the clutch discs into and out of engagement with the friction disc, a second planetary dual gear revolubly carried upon the driven shaft, the gear members thereof being of unequal diameter, a gear on the long sleeve in mesh with the smaller gear member of said second dual gear, and a gear on the short sleeve in mesh with the other gear member of said second dual gear.

3. In a power transmitter, driving and driven shafts journaled in alignment, a planetary dual gear rotated by the driving shaft, a gear on the driven shaft in mesh with one member of said dual gear, a sleeve revoluble about the driven shaft, a gear on said sleeve in mesh with the other gear member of said dual gear, means for locking said sleeve against rotation in one direction, a second sleeve revoluble about said driven shaft, opposed clutch members, one secured against rotation with respect to the first sleeve and the other secured against rotation with respect to said second sleeve, a revoluble friction member common to said clutch members, means for locking said friction member against rotation in one direction, means for engaging the clutch members with the friction member, a second planetary dual gear associated with the driven shaft, a gear on the first sleeve in mesh with one member of said second dual gear and a gear on the second sleeve in mesh with the other member of said second dual gear.

4. In a triple speed power transmitter, driving and driven shafts journaled in alignment, a sleeve journaled about the driven shaft, and revoluble in one direction only, a second sleeve journaled about said shaft for reverse rotation, planetary gearing rotated by the driving shaft and geared with the driven shaft and with said first sleeve, planetary gearing associated with the driven shaft and geared with both of said sleeves, a friction member revoluble in one direction only, and clutch members, one for each sleeve, said members co-acting with said friction member.

In testimony whereof, I have signed my name to this specification.

ALBERT L. JOHNSON.